United States Patent [19]

Hoehn, Hans et al.

[11] 3,755,331
[45] Aug. 28, 1973

[54] 1-N-LOWER ALKYLPIPERIDYL-1H-PYRAZOLO[3,4-B]PYRIDINES AND PYRIDINOLS

[75] Inventors: Hoehn, Hans, Tegernheim; Ernst Schulze, Regensburg, both of Germany

[73] Assignee: E. R. Squibb & Sons, Inc., New York, N.Y.

[22] Filed: July 15, 1970

[21] Appl. No.: 55,250

[52] U.S. Cl....... 260/293.6, 260/293.7, 260/293.87, 260/999
[51] Int. Cl............................................. C07d 29/26
[58] Field of Search ................................. 260/293.6

[56] References Cited
UNITED STATES PATENTS
3,250,769   9/1966   Schmidt et al.................. 260/247.1

Primary Examiner—Henry R. Jiles
Assistant Examiner—G. Thomas Todd
Attorney—Lawrence S. Levinson, Merle J. Smith and Donald J. Perrella

[57] ABSTRACT

New 1-N-lower alkylpiperidyl-1H-pyrazolo[3,4-b]pyridines and pyridinols are useful as hypoglycemic agents.

4 Claims, No Drawings

1-N-LOWER ALKYLPIPERIDYL-1H-PYRAZOLO[3,4-B]PYRIDINES AND PYRIDINOLS

SUMMARY OF THE INVENTION

This invention relates to a new 1-lower alkyl piperidyl-1H-pyrazolo[3,4-b]pyridines and pyridinols and salts of these compounds. These new compounds have the formula (I)
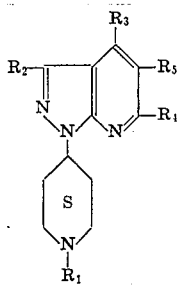

The symbols have the following meanings in formula I and throughout this specification: $R_1$ is lower alkyl, $R_2$ is hydrogen or lower alkyl, $R_3$ is hydrogen or hydroxy, $R_4$ is lower alkyl or phenyl and $R_5$ is hydrogen or halogen.

Preferred are those compounds of formula I wherein $R_1$ is lower alkyl, especially methyl, $R_2$ is hydrogen or lower alkyl, especially methyl, $R_3$ is hydrogen or hydroxy, $R_4$ is lower alkyl, especially methyl and $R_5$ is hydrogen or halogen, especially bromine or chlorine. Also preferred are those compounds of formula I wherein $R_1$ is methyl and $R_3$ is hydroxy.

DETAILED DESCRIPTION

The new compounds of formula I are produced from 5-aminopyrazoles of the formula (II)
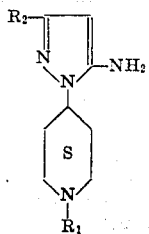

by means of β-keto-acid derivatives of the formula (III)
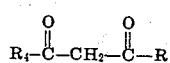

wherein

is a group which may be converted to the

structure in the 4-position of formula I and $R_4$ is the same as previously defined.

When $R_3$ is hydrogen in formula I, the

moiety in formula III may be a dialkylacetal, e.g., an

acetaldehyde dialkyl acetal like acetylacetaldehyde dimethylacetal. When $R_3$ is hydroxy in formula I, the

moiety in formula III may be a lower alkyl ester group, that is R represents a lower alkoxy group, e.g., COO-alkyl. The condensation reaction is effected at a temperature of about 100° to 150°C. in an inert solvent like glacial acetic acid, acetonitrile, formamides, polyphosphoric acid, etc.

The compounds of formula II are produced as described in British Pat. No. 1,057,740, published Feb. 8, 1967, by ring closure of an aldehyde or ketone hydrazone of the formula (IV)
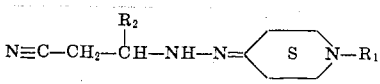

wherein $R_1$ and $R_2$ are the same as previously defined. The cyclization is effected by heating at a temperature of about 90° to 130°C. in an inert liquid organic solvent, e.g., an alcohol like ethanol, butanol or the like, preferably in the presence of a catalyst, e.g., alcoholates like alkali metal alcoholates particularly butylates such as sodium butylate. Reaction of any of the products of formula I wherein $R_5$ is hydrogen with at least two equivalent amounts of halogen, e.g., chlorine or bromine, in a solvent such as glacial acetic acid, chloroform, ethyl acetate or the like, yields a compound of formula I wherein $R_5$ is the corresponding halogen.

The compounds of this invention are hypoglycemic agents which are effective in lowering blood sugar content in mammalian species such as mice, rats, rabbits, dogs or the like in a manner analogous to tolbutamide. Some are particularly noteworthy in their long duration of action. For this purpose a compound or mixture of compounds of formula I is administered orally or parenterally in a conventional dosage form such as tablet, capsule, injectable or the like. A single dose, or preferably 2 to 4 divided daily doses, provided on a basis of about 1 to 50 mg. per kilogram per day, preferably about 2 to 15 mg. per kilogram per day, is appropriate. These may be conventionally formulated in an oral or parenteral dosage form by compounding about 10 to 250 mg. per unit of dosage with conventional vehicle, excipient, binder, preservative, stabilizer, flavor or the like as called for by accepted pharmaceutical practice.

The following examples are illustrative of the invention. They illustrate the preparation of certain members of the group. Other compounds of the invention may be prepared by the same procedure with appropriate variation of the starting materials. All temperatures are on the centigrade scale.

EXAMPLE 1

3,6-Dimethyl-1-(1-methyl-4-piperidyl)-1H-pyrazolo[3,4-b]pyridine 19.4 g. 1-(1-methyl-4-piperidyl)-3-methyl-5-aminopyrazole (0.1mol.) and 13.2 g. freshly distilled acetyl acetaldehyde-dimethylacetal (0.1 mol.) in 38 ml. of glacial acetic acid are heated under reflux for 5 hours. Subsequently, the acetic acid is removed by distillation in vacuo. The oily residue is then taken up in ether and the ethereal solution is neutralized by means of an aqueous ammonia solution, then dried with anhydrous sodium sulfate. After evaporation of the ether, the 3,6-dimethyl-1-(1-methyl-4-piperidyl)-1H-pyrazolo-[3,4-b]pyridine is obtained at b.p. $_{0.6}$ 145°–146°, yield 19.9 g. = 81.5 percent of theory.

The hydrochloride is formed by adding to a solution of 10 g. of the above obtained pyrazolopyridine in 13 ml. of anhydrous ether, with cooling, 15.5 ml. of an alcoholic solution of hydrogen chloride (6N). A white crystalline precipitate forms immediately. Yield 11.8 g. The product is allowed to air-dry overnight, m.p. 263°–267° (dec.).

EXAMPLE 2

1-(1-Methyl-4-piperidyl)-6-phenyl-1H-pyrazolo[3,4-b]pyridin-4-ol

To 9 g. 1-(1-methyl-4-piperidinyl)-5-aminopyrazole (0.05 mol.) in 40 ml. of glacial acetic acid there are added 9.6 g. of benzoylacetic acid ethyl ester (0.05 mol.). The mixture is refluxed for 5 hours, and subsequently the acetic acid is distilled off in vacuo. The oily residue is dissolved in dilute aqueous hydrochloric acid, activated charcoal is then added to the acid solution, the whole is stirred for 1 hour, subsequently filtered and the clear solution is neutralized by means of aqueous ammonia. A white crystalline precipitate forms immediately. Yield 10 g. = 66 percent of the theory. After recrystallization from absolute alcohol, the 1-(1-methyl-4-piperidyl)-6-phenyl-1H-pyrazolo[3.4-b]pyridine-4-ol melts at 245.5°–246.5°.

EXAMPLE 3

3-Methyl-1-(1-methyl-4-piperidyl)-6-phenyl-1H-pyrazolo[3,4-b]pyridin-4-ol

By substituting an equivalent amount of 1-(1-methyl-4-piperidyl)-3-methyl-5-aminopyrazole for 1-(1-methyl-4-piperidyl)-5-aminopyrazole in the procedure of Example 2, 3-methyl-1-(1-methyl-4-piperidyl)-6-phenyl-1H-pyrazolo[3,4-b]pyridin-4-ol is obtained, m.p., 251°–253°.

EXAMPLE 4

6-Methyl-1-(1-methyl-4-piperidyl)-1H-pyrazolo[3,4-b]pyridin-4-ol 14.1 g. 1-(1-methyl-4-piperidyl)-5-aminopyrazole (0.078 mol.) in 60 ml. of glacial acetic acid and 11.15 g. of acetylacetic acid ethyl ester (0.078 mol.) are refluxed for 5 hours. While removing the acetic acid in vacuo, the 6-methyl-1-(1-methyl-4-piperidyl)-1H-pyrazolo[3,4-b]pyridin-4-al begins to precipitate. Yield 17.3 g. = 90 percent of theory. After recrystallization with acetone, the product melts at 245°–246°.

EXAMPLE 5

3,6-Dimethyl-1-(1-methyl-4-piperidyl)-1H-pyrazolo[3,4-b]pyridin-4-ol

By substituting an equivalent amount of 1-(1-methyl-4-piperidyl)-3-methyl-5-aminopyrazole for the 1-(1-methyl-4-piperidyl)-5-aminopyrazole in the procedure of Example 4, 3,6-dimethyl-1-(1-methyl-4-piperidyl)-1H-pyrazolo[3,4-b]-pyridin-4-ol is obtained, m.p. 244°–246°.

EXAMPLE 6

5-Bromo-6-methyl-1-(1-methyl-4-piperidyl)-1H-pyrazolo[3,4-b]-pyridin-4-ol

To 4.92 g. of 6-methyl-1-(1-methyl-4-piperidyl)-1H-pyrazolo[3,4-b]pyridin-4-ol (0.02 mol) dissolved in 25 ml. of glacial acetic acid at elevated temperature, and in turn quickly cooled to room temperature, there is added slowly drop by drop a solution consisting of 3.2 g. of bromine (0.04 mol.) in 10 ml. of glacial acetic acid. During the addition of the bromine solution the brominated compound precipitates which is neutralized with dilute aqueous ammonia and yields (7.1 g. = 87.5 percent of theory) 5-bromo 6-methyl-1-(1-methyl-4-piperidyl)-1H-pyrazolo[3,4-b]pyridin-4-ol, m.p. 233°–235°. The product is recrystallized from absolute alcohol, m.p. 234°–235°.

EXAMPLE 7

6-Methyl-1-(1-methyl-4-piperidyl)-1H-pyrazolo[3,4-b]pyridine

By substituting an equivalent amount of 1-(1-ethyl-4-piperidyl)-5-aminopyrazole for the 1-(1-methyl-4-piperidyl)-3-methyl-5-aminopyrazole, 6-methyl-1-(1-ethyl-4-piperidyl)-1H-pyrazolo[3,4-b]pyridine is obtained.

What is claimed is:

1. A compound of the formula:

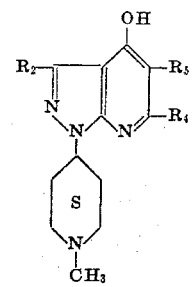

wherein $R_2$ is hydrogen or lower alkyl; $R_4$ is lower alkyl or phenyl; $R_5$ is hydrogen or halogen.

2. A compound as in claim 1 wherein $R_2$ is hydrogen, $R_4$ is methyl and $R_5$ is bromine.

3. A compound as in claim 1 wherein $R_2$ is methyl, $R_4$ is phenyl and $R_5$ is hydrogen.

4. A compound as in claim 1 wherein $R_2$ and $R_5$ each is hydrogen and $R_4$ is phenyl.

* * * * *